Jan. 21, 1958     H. I. MILLER ET AL     2,820,753
NUCLEAR REACTOR
Filed June 23, 1949     2 Sheets-Sheet 1

Fig. 1

INVENTORS:
Herbert I. Miller
Ralph Carlisle Smith
BY
Roland A. Anderson
Attorney

Fig. 2

United States Patent Office
2,820,753
Patented Jan. 21, 1958

2,820,753

NUCLEAR REACTOR

Herbert I. Miller and Ralph Carlisle Smith, Los Alamos, N. Mex., assignors to the United States of America as represented by the United States Atomic Energy Commission Application June 23, 1949, Serial No. 100,876

1 Claim. (Cl. 204—193.2)

The present invention relates to the release of nuclear energy, and more particularly to devices for producing neutron fluxes or maintaining a self-sustaiing chain reaction through neutron induced fission of various fissionable isotopes.

It is generally known that certain atomic nuclei will undergo fission upon absorption of a slow neutron and will yield through this process two nuclei, the sum of whose atomic numbers is approximately equal to the atomic number of the original nucleus. However, a mass defect exists and a consideration of the process in terms of the conservation of energy reveals that a substantial amount of energy is released during the fission process. Furthermore, on the average, more than one fast neutron is emitted for every neutron absorbed to initiate fission.

It is therefore clear that, if the fast neutrons produced by fission can be made to cause new fissions in such proportion that the over-all neutron generation exceeds the over-all losses in and from the system, the chain reaction can be divergent to a desired rate of neutron generation. As a consequence, the energy released during the fission process is available in the form of heat and/or radiation for extended periods of time; that is, during the continuance of the chain reaction. The employment of that energy for useful purposes forms the basis of this invention.

The secondary neutrons produced by the fissioning of a fissionable isotope nucleus have a high average energy. More specifically, the mean energy in the fission neutron spectrum is in the neighborhood of from 0.5 to 3 million electron volts (m. e. v.), and the means free path of such neutrons in a substantialily solid mass of a fissionable isotope is comparatively short, for example, of the order of five centimeters, the result being that the mean time between fissions in such an arrangement will be of the order of a hundredth of a microsecond. While a fast neutron chain reaction can be maintained in such an arrangement if a sufficient quantity of such a fissionable isotope or material is brought together in favorable geometry, i. e., a quantity in excess of the critical mass value, it has been determined that for the purposes of the present invention, the employment of thermal neutrons to produce fissions permits of a number of advantages.

The requirement that the neutrons employed in a controlled neutron chain reaction of the type contemplated by this invention be slowed to near thermal energies by passing them through a slowing medium called a moderator in which they are slowed by atomic collisions, arises out of the following considerations.

As will be shown in more detail later, the cross section for fission (i. e., the probability that fission of a nucleus of fissionable material will occur under neutron bombardment) increases as the energy of the primary or incident neutron is reduced. In fact, the cross section is approximately inversely proportional to the neutron energy. As a concomitant factor, various moderators have different efficiencies as neutron slowing media as well as different absorption cross sections for neutrons. By the use of a suitable moderating material, that is, one in which neutrons are quickly slowed to thermal energies and in which very few neutrons are absorbed, it is possible to take advantage of the increased cross section for fission of the fissionable isotope and thereby reduce by as much as a factor of ten the critical mass value of the quantity of material necessary for a self-sustaining chain reaction.

Furthermore, in a fast neutron chain reaction, neutron generation takes place in extremely short periods of time, and neutron density rises exponentially with time thus presenting control problems which are complicated in solution. If on the other hand, the fission neutrons can be slowed down to thermal energies and a chain reaction initiated, since the mean time between fissions in such a reaction will be great, sufficient control over the reaction can be readily maintained and the desired rate of neutron generation fixed at any desired level.

Isotopes that have been determined to be appropriate for slow neutron chain reaction include, for example, isotopes of uranium (element 92) having the atomic weights 233 and 235 and the isotope of plutonium (element 94) having the atomic weight 239. These fissionable isotopes have no substantial threshold for the energy of the incident neutron, hence fission may be initiated by a slow or thermal neutron, i. e., a neutron whose energy is approximately that of thermal agitation.

It might be noted also that, for a substantial part of the energy spectrum, the cross section for fission for these isotopes is almost inversely proportional to the incident or primary neutron energy, that is, the cross section approximately follows the $$\frac{1}{v}$$

law. Various mixtures of these isotopes in elemental or compound form and mixtures with other elements or isotopes can be used when following the teachings of the present invention, as will be explained hereinafter.

Fermi and Szilard in U. S. Patent No. 2,708,656, issued May 17, 1955, have disclosed methods and means for establishing slow neutron chain reactions which continue in a self-sustaining manner at predetermined levels of neutron density. The system there disclosed provided for the employment of uranium in its normal polyisotopic state, that is, uranium 238 admixed with approximately 0.7 percent of uranium 235, as the fissionable material. Other component elements which form what is now known as a neutronic reactor system include:

(1) A neutron slowing material, known as a moderator, such as graphite in which the fissionable material is dispersed in a geometrical pattern designed to reduce neutron losses.

(2) Heat removal means, for example, channels in heat exchange relationship with the reacting mass and through which a suitable coolant is circulated in order to stabilize temperatures in the system.

(3) An outer casing which serves to reflect neutrons back into the system and thereby reduce the quantity (i. e., the critical mass of fissionable mixture necessary to sustain the reaction. This outer casing is sometimes termed a tamper.

(4) Means for charging the reactive elements into the zone in which the reaction takes place and for removal therefrom of the products of the reaction.

(5) A protective shield is sometimes provided around the reactor to minimize the escape of biologically harmful radiations. Such shields may comprise, for example, bismuth or lead which have been found effective in stopping gamma radiation, hydrogenous materials such as paraffin for absorbing neutrons and/or a massive outer concrete casing.

(6) A monitoring system to determine the reaction conditions at all times.

(7) Control devices generally comprising neutron absorbing materials insertable into the reactive mass to maintain an average state of neutron production and absorption balance at a predetermined level.

(8) A safety device comprising a quantity of neutron absorbing material which may be used to stop the reaction in case of emergency by being automatically inserted into neutron absorbing relationship with the reacting mass.

In considering the requirements for an operating neutronic reactor, the ratio of secondary neutrons produced by the fissions to the original number of primary neutrons of the type required to initiate the fissions in a chain reacting system of infinite size using specific materials is called the reproduction or multiplication factor of the system. The factor is a dimensionless constant and is denoted by the symbol $k$. If $k$ is made sufficiently greater than unity to create a net gain in neutrons over all interior losses, and the system is of proper size so that this gain is not entirely lost by leakage from the exterior surface of the system, then a self-sustaining chain reacting system can be built, to generate neutrons and to produce power in the form of heat by nuclear fission.

Important losses of neutrons within the reacting mass have been found to be by absorption in contaminating impurities which are present with the fissionable mixture (e. g., polyisotopic uranium) or by absorption in uranium 238 without producing fission but instead leading to the formation of plutonium 239 as will be explained later. The absorption by the contaminating materials varies, but the effect on the $k$ factor may be readily determined by the employment of formulae disclosed in the above-mentioned application. The effect of numerous elements has been correlated in this way with the composition of fissionable material and moderator or neutron slowing material. Thus, for example, more normal polyisotopic uranium can be added to a particular system to overcome the absorption effects of impurities in the system.

Uranium 238 has an especially strong absorbing power for neutrons which have been slowed to moderate energies. The energy levels at which this absorption is strongest are known as resonance energies and the neutron capture or absorption by uranium 238 nuclei at these energies is therefore known as the uranium resonance capture or absorption. Such absorption is to be distinguished from absorption in impurities as discussed above.

These two neutron loss factors are most important in the determination of whether a self-sustaining chain reaction can be maintained. Together with the loss of neutron by leakage out of the system, the above-mentioned losses govern the size of the reactor. Thus reactors constructed according to prior art principles have been comparatively large, massive installations requiring extremely large quantities of the various elements and/or materials described above.

Christy in U. S. Patent Application Ser. No. 623,363, filed October 19, 1945, discloses a reactor and a reactor system which overcomes some of the disadvantages present in the reactor described by Fermi and Szilard referred to above. The Christy type reactor employs a composition of a fissionable isotope and moderator in fluid form, such as for example, one in which the fissionable isotope is suspended or preferably dissolved in a liquid moderator such as water or heavy water (i. e., deuterium oxide, $D_2O$). In such an arrangement the amount of fissionable material present, to a large extent, governs the reaction and eliminates the problems attendant upon complex impurity removal techniques and the like. In other words, by the use of the methods and principles therein disclosed, the neutron absorption effect caused by ($a$) the presence of impurities, ($b$) isotopes which absorb neutrons without resulting in fission, ($c$) absorption in the moderator, ($d$) absorption by fission products and the like effects, can be readily overcome by the expedient of increasing the concentration of the specific fissionable isotope present in the system. Thus, higher neutron losses can be tolerated than is the case when natural polyisotopic uranium is used, but losses still can be overcome to the end that a self-sustaining chain reaction can be maintained. As a consequence, the size of the reactor is no longer a critical factor, the new criterion being the concentration of the fissionable isotope.

It should be noted at this point that the efficiency of a neutron slowing material or moderator depends upon the scattering cross section of the material and its atomic weight. Thus, for example, hydrogen has a high scattering cross section and a low atomic weight and is an extremely desirable neutron slowing agent because of the small number of atomic collisions necessary to slow a neutron to thermal energies. When present in the form of water, however, the absorption cross section is comparatively high and the $k$ factors for uranium and water are very close to unity and the advantages of the use of the hydrogen are largely lost.

It is a primary object of the present invention to provide an improved source of neutrons and radiations of various types.

Another object of the present invention is to provide improved control of the reaction in neutronic reactors of the solution or slurry type.

Still another object of the present invention is to provide a reactor system in which compensation is accomplished for at least a part of the neutron losses due to "poisoning" by fission products.

A further object of the present invention is to provide improved moderators for solution type neutronic reactors.

Other objects and advantages will become apparent from the discussion in this specification and from the detailed description of illustrative embodiments which are given by way of example and should not be interpreted to be limitations of the broad principles underlying the invention.

The above objects are attained by providing a composition of a fissionable isotope and a moderator in fluid form and a reactive material which reacts with radiation to emit neutrons, such as a fissionable material suspended or preferably dissolved in a liquid moderator, e. g. water or heavy water, which also contains in suspension or solution a quantity of beryllium material.

Inasmuch as the theory and practice of solution type reactors is discussed at length and in detail in the Christy application, referred to above, only the broad concepts necessary for an understanding of the present invention will be discussed herein.

It has been noted that among the materials which can be employed in the practice of the present invention are the uranium isotopes of mass 233 and 235 and the plutonium isotope 239, all of which have no substantial threshold for the energy of the incident neutron. These isotopes can be obtained in highly concentrated form by isotopic separation procedures or chemical methods (depending on the isotope or element) and brief mention is made here of such methods as background for this invention and to emphasize further benefits derived from following the novel methods and using the apparatus herein described.

The fissionable isotope uranium 235 may be obtained in several ways. Isotope separation devices such as a mass spectro-separator, similar in operation to a mass spectrograph but with larger ion currents, have been found satisfactory. Another method of separating the uranium 235 isotope from the naturally occurring isotopic mixture is by gas diffusion methods employing uranium hexafluoride gas and diffusion barriers. In both methods the separation is not completed in a single stage, but rather proceeds step-wise, or in cascade fashion, with the accepted portion of each step being further separated and the rejected portion being recycled. It will thus be seen that the fissionable isotope is observed to occur in greater abundance or concentration, with each advancing step in the process.

Uranium 233 may be formed by subjecting a quantity of thorium (element 90) 232 to neutron bombardment, the resulting reaction being as follows:

If desired, the uranium 233 can be separated from the thorium parent by chemical methods but as will be seen from the discussion herein, this separation is not necessary if the concentration of the uranium isotope is sufficiently high according to the standards hereinafter set forth.

Plutonium 239 is formed principally by irradiation of uranium 238 with neutrons. As a production method, one way of subjecting large quantities of uranium to a high neutron flux is the employment of a reactor such as is disclosed in the above-mentioned patent. The reaction leading to the formation of plutonium 239 is:

Since the plutonium is formed in the original uranium slugs dispersed in the graphite reactor, chemical extraction and/or precipitation processes may be used to obtain the isotope 239 in a substantially pure state, but here again complete separation is not necessary from the standpoint of the present invention.

The materials composing the fluid moderator, or which are present in such a moderator, which react with radiation to emit neutrons (herein termed reactive materials) are such materials which react with alpha or gamma radiation and are further characterized by a low capture cross section and preferably a high scattering cross section for neutrons.

Thus, for example, beryllium in elemental or compound form is a desirable material for employment in the present invention. It is known for example that beryllium nuclei will react with gamma radiation of the energies occurring in the fission process and also with alpha radiation given off by such fissionable isotopes as plutonium 239 or uranium 233, to emit neutrons for utilization in irradiation operations or in a neutronic reactor.

It is preferable in the practice of the present invention to employ the reactive material in the form of a soluble salt such as beryllium nitrate, beryllium sulphate or beryllium fluoride. Likewise, it is generally preferred in the practice of the present invention to employ a water soluble salt containing the fissionable isotope in the desired isotopic concentration or in a substantially pure isotopic state. For example, uranium salts of high water solubility such as uranyl nitrate, uranyl sulphate or uranyl fluoride, plutonium salts such as plutonyl sulphate ($PuO_2SO_4$), plutonyl nitrate ($PuO_2(NO_3)_2$), plutonium nitrate ($Pu(NO_3)_4$), etc., may be dissolved in water and employed in the neutronic material herein contemplated.

It will be apparent to one skilled in the art that by employing a composition of a material enriched in a fissionable isotope with a water moderator and a reactive material, and following the practices and standards hereinafter set forth, it is possible to vary the neutron gain (that is, vary the multiplication factor $k$) by increasing the concentration of the fissionable isotope in a given volume. It has been determined that the neutron losses due to the presence of an absorbing isotope such as uranium 238 can be made relatively unimportant without eliminating the uranium 238 from the system. Thus, if an isotopic mixture of uranium 235 and uranium 238 is employed, if the concentration of uranium 235 is sufficiently above that of natural uranium, and a reactive material is provided, the losses due to absorption of neutrons by the uranium 238 become negligible and can be neglected in the design of the reactor, particularly one using a moderator of high neutron absorption properties such as water even though the amount of uranium 238 is high. It has been determined further, that where the concentration of uranium 235 is above about one percent and preferably above five percent by weight of the uranium present, and a reactive material is provided, a great reduction in the amount of uranium in optimum geometry necessary to establish a chain reaction (i. e., the critical mass of uranium required) can be effected, and complete or substantially complete removal of absorbing isotopes or impurities is unnecessary.

For example, if a water moderator is used and the fissionable mixture is the normal isotopic uranium mixture containing 0.7 percent of uranium 235, the quantity of material (in the most favorable geometry) necessary to sustain a chain reaction is extremely large—if a chain reaction can be established at all. By way of comparison, if the enrichment is 180% (the uranium 235 content about two percent of the uranium present), only about 1.7 tons of uranium are required under the same conditions of operation. Even more striking is the determination that when the uranium composition contains fifteen percent of uranium 235 and beryllium is present in solution in the moderator, a well controlled chain reaction can be maintained when only a few kilograms of said composition are used. Further reductions of these critical mass values can be secured through the use of neutron reflectors to cut down leakage losses, but the use of such reflectors does not affect the general principles here noted.

The critical mass values for a reactor of substantially spherical geometry, as well as the critical dimensions and concentration of the fissionable isotope and the interdependence of these criteria for fissionable isotopes such as have been mentioned, may be calculated as follows:

The neutron distribution in a reactor as a function of the radius of the reactor is the solution of the diffusion equation:

$$\Delta n + \frac{(kP_t - 1)}{L^2} n = 0 \qquad (1)$$

where $n$ is the neutron density and $\Delta n$, where $\Delta$ is the Laplacian operator, is defined by the relation:

$$\Delta n = \frac{\partial^2 n}{\partial x^2} + \frac{\partial^2 n}{\partial y^2} + \frac{\partial^2 n}{\partial z^2}$$

for a system with Cartesian coordinates, $x$, $y$ and $z$, $P_t$ is the probability of a neutron being slowed to thermal energies before leaking out of the reacting mass, $k$ is the reproduction factor for an infinite medium, and $L$ is the thermal diffusion length of the neutrons in the dispersion of the fissionable isotope in moderator. If the solution (for a spherical homogeneous reactor where $r$ is the radius of the reactor) is written $$\frac{\sin Kr}{r}$$

then $$K^2 L^2 = kP_t(K) - 1 \qquad (2)$$

where $K$ is a constant.

Let the concentration of fissionable isotope be measured by $$X = \frac{\text{thermal absorption by the fissionable isotype per unit volume}}{\text{thermal absorption by moderator per unit volume}}$$

Then $$L^2 = \frac{L_0^2}{(1+X)\left[1 + \frac{1}{5}\frac{\sigma_{st}(M)}{\sigma_{st}(M)} X\right]} \qquad (3)$$

where $L_0$ is the thermal diffusion length of the neutrons in the pure moderator and $\sigma_{at}(M)$ and $\sigma_{st}(M)$ are respectively the thermal neutron absorption and thermal neutron scattering cross sections of the moderator. The second term in the denominator is a usually negligible correction to the total cross section. It is assumed that the presence of the fissionable isotope does not appreciably change the number of hydrogen nuclei per cubic centimeter of the reacting solution. Also $$K = \frac{V_e X}{1+X} \quad (4)$$

where $V_e$ is the effective number of neutrons per thermal fission of the fissionable isotope and includes the additional neutrons formed by fast fission and is further defined by the relation $$V_e = V\left[1 + (V-1)\frac{5.5\sigma_{at}(M)\sigma_{af}(F)}{\xi\sigma_{sf}(M)\sigma_{at}(F)}P_1(K)X\right] \quad (5)$$

where $\sigma_{sf}(M)$ and $\sigma_{af}(F)$ are the fast neutron scattering cross section of the moderator and the absorption (and hence the fissioning) cross section of the fissionable isotopes respectively, $\sigma_{at}(F)$ is the absorption cross section of the fissionable isotope for thermal neutrons and V is the actual number of neutrons produced per fission. The term "fast fission" includes the range where the fission cross section is essentially constant, i. e., from 10,000 e. v. up to fission energies. Or stated another way, it was assumed that the fast fission cross section of about 1 barn ($10^{-24}$ cm.$^2$) remained constant down to an energy E, expressed in electron volts and defined by $$\frac{\sigma_{at}(F)}{\sqrt{40E}} = 1$$

The region of energies greater than E was taken for the fast group. The number of collisions necessary to slow a neutron to thermal energies is then $$\frac{5.5}{\xi}$$

where $\xi$ is the mean natural logarithmic energy decrement per collision in the moderating medium, $P_1(K)$ is the average probability of escaping leakage for these energies. Then $$\frac{\sigma_{at}(M)\sigma_{af}(F)}{\sigma_{sf}(M)\sigma_{at}(F)}X$$

gives the probability that a collision results in fission, $$\frac{\sigma_{at}(M)}{\sigma_{at}(F)}X$$

is only a measure of the concentration of fissionable isotope.

Substituting (3), (4), (5), in (2) the result is $$\frac{K^2L_0^2}{\left[1+\frac{1}{5}\frac{\sigma_{at}(M)}{\sigma_{st}(M)}X\right]} =$$

$$V\left[1+(V-1)\frac{5.5\sigma_{at}(M)\sigma_{af}(F)}{\xi\sigma_{sf}(M)\sigma_{at}(F)}P_1(K)X\right]XP_t(K)-(1+X) \quad (6)$$

Expanding the denominator on the left, one gets a quadratic equation for X.

$$\frac{V(V-1)5.5\sigma_{at}(M)\sigma_{af}(F)}{\xi\sigma_{sf}(M)\sigma_{at}(F)}P_1(K)P_t(K)X^2 +$$

$$\left[VP_t(K)-1+\frac{1}{5}\frac{\sigma_{at}(M)}{\sigma_{st}(M)}K^2L_0^2\right]X-[1+K^2L_0^2]=0 \quad (7)$$

When Fermi's concept of neutron age applies in the slowing down procedure, so that the distribution of nascent thermal neutrons from a point source of fast neutrons can be written $$e^{-\frac{r^2}{4\tau}}$$

in which r is a distance from the source, then $$P_t(K) = e^{-K^2\tau}$$

and $$P_1(K) = e^{-K^2\tau_1}$$

$\tau$ is the neutron age which is ⅙ of the mean square displacement of a neutron from place of birth to the point at which the neutron reaches the energy for which the computations are to be made. $\tau_1$ is the appropriate age of the fast neutrons making fast fission and is the range of the neutron for the first few collisions. In water, the distribution of energetic neutrons from a fission source is $$\frac{1}{r^2}e^{-\frac{r}{l}}$$

After the first few collisions, the distribution spreads in an approximately Gaussian manner with an age $\tau$ from this lower energy to thermal energies. This consideration leads to $$P_1(K) = \frac{\tan^{-1} Kl}{Kl}$$

and $$P_t(K) = \frac{\tan^{-1} Kl}{Kl}e^{-K^2\tau}$$

The Equation 7 for X is solved for various values of K. Then the density of a fissionable isotope such as plutonium 239, which is proportional to X, is known as a function of the critical dimensions of the mixture. For a sphere $$R_s = \frac{\pi}{K}$$

for a cylinder of infinite length $$R_c = \frac{2.4048}{K}$$

and for a slab the thickness $$T = \frac{\pi}{K}$$

This permits calculation of the critical mass, mass/cm.$^3$, and mass/cm.$^3$ of plutonium 239, for example, respectively for a sphere, cylinder and slab, as a function of the density of plutonium 239, or as a function of the dimensions.

Except for the region of large density, the critical mass of uranium 235 or uranium 233 is greater than that of plutonium 239 by the factor $$\frac{\sigma_{at}(Pu^{239})}{\sigma_{at}(U^{235})}$$

or $$\frac{\sigma_{at}(Pu^{239})}{\sigma_{at}(U^{233})}$$

i. e., by 1.7 or 1 for the same dimensions of the mixture.

Since the function of the moderating medium, i. e., water, heavy water ($D_2O$) or the other low atomic number element having a low capture cross section, is to slow the fission neutrons, the critical size will be of the order of the slowing down distance. The minimum concentration is such that only one of the 2.13 effective neutrons per absorption in a uranium 235 nucleus and 1.98 effective neutrons per absorption in a plutonium 239 nucleus is absorbed by the chain reactive fissionable isotope compound, the thermal neutron absorption by the fissionable material will then be about equal to that by the moderator; the optimum concentration (minimum critical mass in a sphere) will be about three times this minimum.

The control of a neutronic reactor is an important factor, since if the reaction is permitted to occur at an unduly rapid rate the reaction will take place with explosive violence. Control of a neutronic reaction may be effected by variation of one or more of the above losses or by variation in the concentration of fissionable isotope. For example, the reactor may be controlled by introducing into or withdrawing from the reaction zone high neutron absorbers such as cadmium or boron usually in the form of control rods.

In order that the significance of a control by neutron absorbing impurities be more fully understood, the mechanism of fission will be discussed further. Not all of the fast neutrons originating in the fission process are emitted immediately. Each chain reacting system has a characteristic time for neutron generation based upon the percent of enrichment of fissionable isotope employed in the composition with the moderator, the type of moderator, the reflector used and the like. This characteristic time may be used as a base to which may be related the determination of whether the neutrons emitted in the fission process are "prompt" or "delayed." In the fission of uranium 235 about one percent may be termed "delayed" neutrons, although the percentage varies for the different isotopes. These delayed fast neutrons may appear at any time up to several minutes after the fission has occurred. In uranium 235, for example, half of these neutrons are emitted within six seconds and 0.9 within 45 seconds. The mean time of delayed emission is about 5 seconds. The neutron reproduction cycle is completed by 99 percent of the neutrons in about 0.00003 second in a fluid type reactor system employing a water moderator such as forms the basis of the present invention, although the dependence of this value on the moderator chosen should be noted. But if the reactor is operating with a reproduction ratio near unity, the extra one percent may make all the difference between an increase or a decrease in the activity of the reactor. The fact that the last neutron in the cycle is held back, as it were, imparts a slowness of response by the reactor system to the changes in the control means that would not be present if the fission neutrons were all emitted instantaneously.

For cases in which the reproduction ratio (R) differs from unity by appreciably less than one percent, the rise of neutron density, or more specifically the value N to which the number of neutrons has risen from an original value $N_0$, after a lapse of time of $t$ seconds during and before which the pile has operated at a fixed value of R ($N_0$ being the number of neutrons at the beginning of $t$, i. e., after disappearance of transient effects due to any preceding change in R) is given by $$N \approx N_0 e^{wt}$$

where:

$$w = \frac{R-1}{\alpha-(R-1)} \frac{1}{T}$$

In this formula $\alpha$ is the fraction of the neutrons that are delayed, e. g., in the case of the uranium 235 isotope $\alpha=0.0067$, T is the mean delay time for the delayed neutrons which is in the neighborhood of five seconds in the case of the same isotope and R is the reproduction ratio of the system. The above formula is only approximate and applicable for low values of R because it uses an average delay time.

As an example, suppose as a result of moving the control rod R becomes 1.001, and assume that the system has settled down to a steady exponential rise in neutron density, then $$w = \frac{0.001}{0.0067-0.001} \frac{1}{5} = \frac{1}{28.5}$$

that is, $N/N_0=2.72$ in 28.5 seconds. Hence, doubling of the neutron density occurs about every 20 seconds and continues indefinitely. The above formula thus indicates the rate of rise for relatively low values of R and shows how the reduction by the rate of the delayed neutron effect is particularly significant in the stated lower range of R values. Strictly speaking, the given equation holds only for the steady state, i. e., where R has been held constant for some time; an additional transient term must be included to obtain an accurate representation of the neutron density during the first few seconds after a sudden change of R.

If R were made exactly 1.0067, a more detailed theory shows that the neutron density would be more than tripled each second. However, if the reproduction ratio R is several percent greater than unity, so that the one percent delayed neutrons are unimportant compared with $R-1$, the density increases at a much more rapid rate as given approximately by $(R-0.0067)^{t/l}$ where $l$ is 0.00003 second, the normal time to complete a cycle in a reactor such as is described hereinafter. Thus if R were to be made 1.04, the neutron density would increase in 0.03 second by a factor of approximately $10^{17}$ over its original level. However, if R were 1.02 and 1.03, the factor by which the neutron density would be multiplied each second, would be 1100 and 700,000 respectively. It is thus apparent that too high a reproduction ratio in a practical system leads to the necessity of inserting what may be considered as an excessive amount of controlling absorbers to reduce the effective reproduction ratio to unity. An exceedingly dangerous condition could exist if by accident these absorbers were suddenly completely removed, as the time required for reinserting the absorbing material might be too long to prevent destruction of the system. As the same eventual density can be obtained with a reproduction ratio only slightly over unity, as with a higher ratio, only at a slower rate, the lower reproduction ratios which exceed unity by not substantially more than about 0.01, or an amount equal to the percentage of the neutrons formed which are "delayed neutrons" are preferred in practice in the interest of safety.

It is a feature of the present invention to increase the safety margins in controlling a neutron chain reaction when above normal concentrations of fissionable isotopes are present by the addition of reactive materials. It has been determined that the gamma rays accompanying fission are not all emitted promptly, i. e., in time orders comparable to those for prompt neutrons, and that of the order of one to two photons of energy above 2.2 m. e. v. are emitted per fission by fission products with half-lives greater than one second. Thus in the case of a reactor system employing beryllium in solution in the moderator further delayed neutrons for control and other purposes are made available by the gamma-neutron reaction, the threshold energy for which is about 1.6 m. e. v. for beryllium. In fact, it has been shown that the ratio of delayed neutrons to prompt neutrons may be increased more than five percent. Obviously, the prompt neutrons available are likewise increased by prompt gamma-neutron reactions in the beryllium present, but not in proportion to the increases in the delayed neutrons.

The application of the principles set forth just above to neutronic reactors utilizing high concentrations of fissionable isotopes, will be more fully understood by reference to the drawings wherein a preferred embodiment of the present invention is shown in the form of a neutronic reactor utilizing an aqueous ($H_2O$) solution of uranium sulphate containing about 14.6 percent of the 235 isotope of uranium and six percent beryllium sulphate, hydrated.

Figure 1:
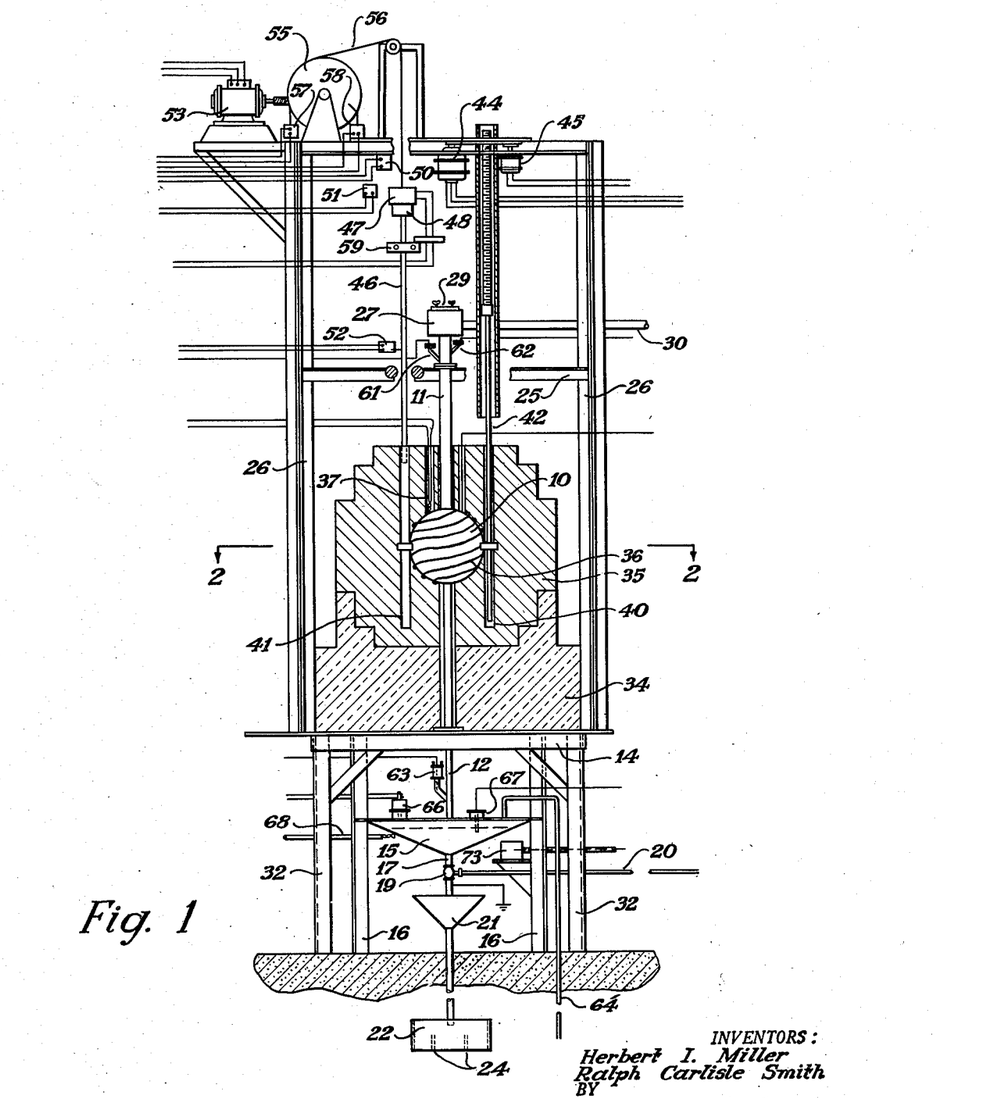
Figure 1 is a vertical view partly in section of a neutronic reactor system which has been constructed in accordance with the principles of the present invention.
Figure 2:
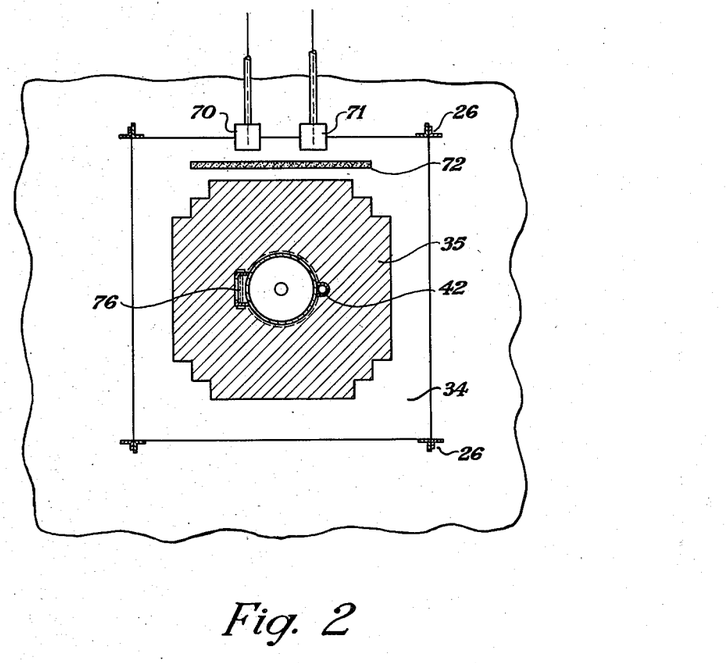
Figure 2 is a transverse sectional view of the device of Figure 1 taken on the line 2—2 in Figure 1.

Referring to Figs. 1 and 2, a reactor tank 10 of spherical form is provided approximately 12 inches in diameter and having a volume of 14.95 liters, made of type 347 18-8 stainless steel, which is sufficiently thin, for example $1/32$ inch thick, to absorb but minor amounts of neutrons. The sphere is made from two spun hemispheres with a $3/16$ inch equatorial flare, and the hemisphere flares are welded together. Polar flares are also provided, to one of which is welded a top pipe 11. A bottom pipe 12 is welded to the other flare. The top pipe is 1½ inches inside diameter with a $1/16$ inch wall and the bottom pipe is ¾ inch outside diameter with a ⅟₁₆ inch wall. Unless otherwise specified hereinafter, all piping in the solution system is of stainless steel.

Referring first to bottom pipe 12. This pipe extends downwardly through a heavy frame base 14 and then through the top of an inverted conical pan 15 to terminate inside thereof just above the bottom point of the pan. Pan 15 is supported on risers 16, which also partially support base 14. Pan 15 can be emptied by a dump pipe 17 under the control of a dump valve 19 having an extension handle 20. A funnel 21 is provided through which contents of sphere 10 and pan 15 can be conducted into a sump 22, when dump valve 19 is open. In view of the neutronic reactivity of the solution to be used in reactor tank 10, tank 22 may be provided with neutron absorbers such as cadmium baffles 24, to prevent neutronic reaction therein.

Top pipe 11 extends upwardly through a cross-frame member 25, this cross-frame member being supported by uprights 26 resting on frame base 14. Above cross-frame member 25 upper pipe 11 terminates in an expanded portion 27 provided with a removable cap 29.

An overflow pipe 30 is provided leading outwardly from expanded portion 27. The remainder of the liquid handling system will be explained later.

Inasmuch as a very considerable weight will be placed on base 14, base 14 is additionally supported by base uprights 32. A reflector base 34 formed from carefully machined graphite bricks is piled on base 14, this graphite being of high neutronic purity. Resting on graphite base 34 and surrounding reactor tank 10 is a reflector 35 of beryllium oxide bricks having a density of about 2.7 gms./cm.$^3$, carefully finished to fit together with a minimum of air spaces, of maximum neutronic purity, and with bricks adjacent the reactor tank 10 being shaped to the contour of the tank. The beryllium oxide reflector is roughly of spherical shape to provide a neutron reflecting layer around the reactor tank. Before assembling the reflector around the reactor tank, means for detecting leaks in the tank are provided in the form of small, preferably nylon insulated, copper wires 36 wound around the tank 10. While only a single circuit is shown, separate circuits can be used for the top, equator and the bottom of the reactor tank, if desired. If a leak from the tank occurs, the solution will saturate the insulation on the wire and ground it to the reactor tank 10, as will be later described. Thermocouples may also be inserted in various positions around the reactor tank, as indicated by thermocouple 37 positioned adjacent the top of the reactor tank 10.

As the reflector 35 is being assembled, two vertical tangential slots are built into place slightly away from tank 10 in the reflector, a control rod slot 40 and a safety rod slot 41 close to tank 10. Both of these slots may be provided with an aluminum lining or scabbard attached to the equator of tank 10. Operating in the control rod slot 40 is a control rod 42. The control rod proper is a strip of .032 inch cadmium 34 inches long, wrapped around a hollow brass tube ¾ inch in diameter and 34 inches in length, and is moved in a vertical direction with a total length of motion of 40.7 inches by a control rod motor 44, the position of the rod being indicated by self-synchronous repeater 45.

The safety rod 46 consists of a cadmium sheet .032 inch thick, 2½ inches wide and 42 inches long, sandwiched for strength between two similar pieces of brass. In its bottom position, its lower end extends 8 inches below the center of the tank 10. Normally an electromagnet 47 holds the safety rod out of the reflector by means of a safety rod disc 48 of magnetic material attached directly to the top of the rod. Any interruption of current in the magnet, brought about either manually or by means of any of the safety circuits, as described in the Christy application SN 623,363, will release the rod to fall freely into the reflector by gravity. A tripping switch 50 is provided just above the top position of the magnet 47 so that if the magnet should be lifted too high, the safety rod will be dropped. In addition, upper and lower position indicator switches 51 and 52, respectively, are provided so that the "in" or "out" position of the control rod can be made known to the operator of the reactor.

The safety rod is raised and lowered as desired by a safety rod motor 53 operating a drum 55 winding a cable 56 attached to the electromagnet 47. Limit switches 57 and 58 are provided, operated by a stop on the drum 55 to limit the top and bottom respectively, of the safety rod travel. Limit switch 50 is an additional safeguard in case limit switch 57 does not operate to stop motor 53. A sliding brake 59 is provided on the safety rod to soften the blow on the structure when the rod is dropped.

Certain other safeguards are attached to the system as so far described, and while their position will be indicated here, their functions will be taken up later. For example, immediately below the expanded portion 27 on the top of the upper pipe 11 are a pair of solution contact switches 61 and 62, switch 61 being slightly lower than switch 62. These switches are used to monitor the upper level of solution in the reactor system. A lower level indicator switch 63 of similar type is provided on lower pipe 12 just above the top of conical pan 15. The top of pan 15 is provided with a pan air supply line 64 and an electrically operated air release valve 66, and a level indicator 67. Pan 15 is also provided with a pan thermocouple 68 for determining the temperature of the liquid in the pan 15.

Neutron monitoring ionization chambers are also provided. A pair of BF$_3$ ionization chambers 70 and 71 (Fig. 2) are provided outside of the reflector 35 and positioned behind a lead shield 72 where the chambers will still receive a sufficient neutron density during operation of the reactor to give proper monitoring of the neutron reactivity. An additional ionization chamber 73 (Fig. 1) is provided adjacent pan 15 to monitor the radiation activity of the liquid in this pan 15.

The liquid handling system will next be referred to. Inasmuch as one preferred solution used in the reactor is a uranyl sulphate and beryllium sulphate solution in ordinary water, with the uranium 235 content of the uranium much higher than in natural uranium, it is desirable (but not essential as shown later) that evaporation from the solution be controlled so that the solution being handled may remain substantially constant in concentration during use and therefore is separated from the operating air. To attain this result, a system is provided utilizing compressed air at a constant predetermined pressure and applying the same through pipe 64 to the surface of the solution in pan 15. Thus the solution may be forced upward through inlet pipe 12 into reactor tank 10 at a rate controlled by valves in said air system (not shown).

While the entire volume of the solution is normally stored in conical tank 15, no chain reaction will take place therein for several reasons. First, the sphere is the most efficient shape for a neutronic reactor, whereas the conical shape is not. Second, neutronic reactors of small size have an extremely high neutron leakage factor. When a reflector is used around tank 10, critical mass can be obtained with a lower concentration of uranium 235 because the reflector returns neutrons to the solution and very effectively reduces the amount of uranium 235 required in the tank 10 to cause the chain reaction to be attained. Since conical pan 15 has no reflector, most of the escaping neutrons are lost and do not return. In consequence, no chain reaction takes place in pan 15.

However, the solution in pan 15 can become highly radioactive after operation of the device as a neutronic reactor, due to the accumulation of radioactive fission products therein. Ionization chamber 73 is used to monitor this radioactivity and if it becomes too high, the solution may have to be drained into storage tank 22 until the radioactivity decays to a safe handling value. Alternatively, an auxiliary tank may be provided as a substitute for tank 15.

Other features should be pointed out. It will be noted that neither the safety rod nor the control rod enters the reactor tank 10. Small reactors such as shown and described herein have such high neutron leakage that they usually are not of critical size without a reflector and are dependent for proper operation for a given size, concentration and shape on the efficient action of the reflector. In such a small reactor the insertion of neutron absorbers even in the reflector outside of the reactor tank will prevent the reflector from returning sufficient neutrons to keep the chain reaction sustained with the reactor having a mass that would be critical if it were not for the absorption in the reflector. This affords a very simple and effective method of control without insertion of neutron absorbers into the reacting portion of the reactor.

Of the uranium salts, $UO_2SO_4$ is preferred for use in the reactor instead of, for example, uranyl nitrate, first, because there is less unwanted neutron absorption with the sulphate than there is with the nitrate, and, second, the sulphate is more stable in water than the nitrate. Furthermore, 18–8 stainless steel has showed extremely low corrosion rates after being in contact with $UO_2SO_4$ solutions from 1 to 2 weeks. Consequently, all portions of the system which are to come into contact with $UO_2SO_4$ are pickled with normal 3M $UO_2SO_4$ solution for from 1 to 3 weeks before starting operations.

In starting up the device for the first time, a sufficient amount of distilled water is placed in conical pan 15 to properly fill the reactor tank and its attached pipes to the proper operating level as indicated by solution switch 61. Uranyl sulphate containing isotope uranium 235 to the point where the average composition of the material is about 14.7 percent uranium 235 as indicated by mass spectrometer analysis and approximately 6 percent of beryllium sulphate are added to 1 or 2 liters of the water withdrawn from the conical reservoir, and dissolved therein. The resulting solution is replaced in the tank 15 and stirred as, for example, with an electric mixer through a cap to prevent evaporation of the water. The solution is then run up and down in the reactor tank 10 several times, while the control rods are in, to improve the mixing. When the neutron counting rate, as indicated by monitoring counters 70 and 71, does not change with each successive filling of the tank 10, the solution is adequately mixed. This method of adding the salt increases the total volume of the solution at each step, and to avoid accumulation of too much excess solution, some of the solution is removed during the addition, evaporated, and the recovered $UO_2SO_4$ made ready for further use.

To establish a chain reaction uranyl sulphate is added in the manner described, until critical conditions are reached, i. e., where the neutron reproduction ratio in the reactor tank equals unity. With the 12 inch reactor tank, critical conditions are obtained with about 570 grams of uranium 235.

With the cadmium control rod partly in, some uranium 235, such as approximately 1.8 grams, is removed from the reactor tank so that the control rod is for practical purposes in its full out position with critical conditions prevailing. The control rod is then calibrated in terms of mass of uranium 235 in the reactor tank by adding uranium 235 (as $UO_2SO_4$) and determining the new critical position of the control rod, i. e., the position where the neutron reproduction ratio is unity.

Because of the large coefficient of expansion of water, several of the pertinent constants, such as, for example, the age of the neutrons and the thermal diffusion length (previously defined), depend on the temperature. A very noticeable change in external leakage and, consequently, in critical position of the control rod will take place if the temperature changes even a few degrees. This temperature effect in the presently described reactor is 7.3 grams equivalent of uranium 235 per degree C.

For this reason, it is desirable to keep the reactor at a substantially constant temperature while operating.

One manner by which the temperature may be stabilized is to enclose the reactor in a well insulated room and maintain the room at an elevated temperature, such as, for example, 39° C.

The reactor is now in condition to be operated at a low power level, such as, for example, 1 watt. To obtain a desired power level after critical mass is obtained with the control rod partly in, the control rod is retracted, so that the reactor is super critical. An exponential rise in neutron density then occurs, at a rate determined by the amount of removal of the control rod. With the control rod just slightly removed from the critical position, single doubling of the neutron density can be obtained in days or hours, if desired. Further removal of the rod will, of course, increase the rate of neutron density rise. When the desired power level is reached, the rod is returned to position where the reproduction ratio is again unity. With the temperature stabilized, only minor movements of the control rod will be needed to maintain the desired power level.

The reactor described is useful as a source of neutrons, and materials to be irradiated can be placed in a re-entrant tube extending downwardly into reactor tank 10 through pipe 11 from expanded portion 27 by removing cap 29, or placed in the vicinity of the thermal or fast neutron column of the reactor, as disclosed in the above-referenced Christy application. Another of the main uses of the device described is for the determination of the neutronic behavior of solutions containing large amounts of uranium 235 under various temperatures and concentrations, while undergoing a self-sustaining chain reaction by nuclear fission.

While the embodiment above described has used uranium 235 as the fissionable isotope, it has been pointed out above that plutonium 239 and uranium 233 can also be used.

It has been found that a chain reaction can be established using a suspension or dispersion of at least about $10^{-2}$ grams of a fissionable isotope such as plutonium 239, uranium 233 or uranium 235 per cubic centimeter of aqueous dispersion using ordinary water having beryllium dissolved or suspended therein. The limiting minimum concentration is dependent to a substantial degree upon the moderator and the reactions which take place as a result of alpha particle or gamma ray bombardment of the beryllium present therein. Thus where the moderator has negligible neutron absorption as is the case with $D_2O$, the concentration when beryllium is present, is less than $10^{-4}$ grams of plutonium or other fissionable isotope per cc. of solution.

Above these minimums a substantial range of concentration is permissible and this concentration may be as high as about 8–10 grams of uranium per cc. of dispersion. However, it is rare that concentrations much above about 2 grams of fissionable isotope per cc. of solution are used. Preferably the dispersion should be a true solution which is substantially free from undissolved suspended fissionable solids since control of the reaction is much easier in such a case.

In order to control the reaction without excessive effort it generally is preferred to maintain the solution or suspension at a substantially constant concentration. It is a feature of the present invention, however, that (by reason of the increase in the number of delayed neutrons occasioned by the presence of beryllium in the solution) the limitations on the variation in concentration of the solution are substantially relaxed while adequate control of the reaction is still maintained.

The amount of fissionable isotope which should be present in order to establish a self-sustaining neutron chain reaction depends to a substantial degree upon the concentration of the fissionable isotope in the moderator and also upon the neutron absorption characteristic of the moderator used. In general, it can be said that the amount of uranium 235 present should be at least about 300 grams with optimum concentration and using either pure uranium 235 or uranium concentrates containing 5 to 10 percent or more of uranium 235. The exact amount required will also depend upon the fissionable isotope which is used. For example, it has been found that when plutonium 239 is used as the fissionable isotope only about two-thirds of the weight of isotope required for uranium 235 is necessary.

The following tables indicate generally the trend. Table I tabulates the quantities and critical size required for a spherical reactor containing uranyl sulphate dissolved in water, when the reactor is provided with an infinite $D_2O$ reflector and when the uranium is enriched to contain 12.5 percent by weight of uranium 235, the balance being uranium 238. In the table, Z denotes the number of atoms of uranium 235 present per molecule of $H_2O$. C denotes the concentration in percent by weight of uranyl sulphate. $r$ denotes the radius of the sphere in centimeters and G denotes the critical quantity of 235 required in grams.

Table I

| Z | C | r, cm. | G, gm. |
|---|---|---|---|
| $1 \times 10^{-3}$ | 2.0 | 85 | 32,770 |
| $1.5 \times 10^{-3}$ | 3.0 | 26.8 | 1,524 |
| $2.0 \times 10^{-3}$ | 3.9 | 20.1 | 848 |
| $2.4 \times 10^{-3}$ | 4.7 | 17.9 | 712 |
| $2.8 \times 10^{-3}$ | 5.4 | 16.3 | 622 |
| $3.2 \times 10^{-3}$ | 6.1 | 15.3 | 582 |
| $3.6 \times 10^{-3}$ | 6.8 | 14.6 | 564 |
| $4.0 \times 10^{-3}$ | 7.5 | 14.0 | 548 |
| $5.0 \times 10^{-3}$ | 9.3 | 13.0 | 537 |
| $6.0 \times 10^{-3}$ | 10.9 | 12.4 | 547 |
| $10 \times 10^{-3}$ | 16.9 | 11.0 | 587 |

From the above table it will be apparent that as the concentration of uranium 235 in a solution increases from $1 \times 10^{-3}$ atoms of the uranium 235 per molecule of $H_2O$ the critical radius of the reactor decreases and the critical mass of 235 decreases to a minimum somewhat over 500 grams and thereafter the critical mass increases with increasing concentration.

Where a neutron moderator which has less tendency than water to absorb neutrons is used, the critical mass for a chain reaction may be substantially smaller. The following table tabulates the critical mass which is required for various concentrations of a uranyl-plutonyl sulphate solution in $D_2O$ using an infinite $D_2O$ reflector. The concentration of plutonium was 12.5 percent based upon the total weight of uranium and plutonium. In the table, Z and G are as defined above. $V_x$ is the critical volume in liters.

Table II

| $Z \times 10^{-3}$ | 0.1 | 0.2 | 0.25 | 0.3 | 0.5 | 1.0 | 2.0 |
|---|---|---|---|---|---|---|---|
| $V_x$, Liters | 180 | 80 | 62 | 51 | 32 | 18 | 11 |
| G, gm | 290 | 210 | 205 | 205 | 210 | 240 | 290 |

From the above Table II it is shown that a minimum critical mass as low as about 200 grams of plutonium 239 is capable of sustaining a reaction in a $D_2O$ moderator with an infinite $D_2O$ reflector. Not less than about 300 grams of uranium 235 would be required where uranium 235 to be substituted for the plutonium in the above solution.

The variation in critical mass which is required to sustain a neutron chain reaction depends to a very substantial degree upon the nature and thickness of the neutron reflector. The following table tabulates data which have been computed respecting the critical radius required to establish a neutron chain reaction in an aqueous solution containing $2.8 \times 10^{-3}$ atoms of uranium 235 per molecule of water in the form of a uranyl sulphate solution in which the uranium contains 12.5 percent uranium 235 using various reflectors infinite in size.

Table III

| Reflector | Graphite | $D_2O$ | $H_2O$ | $BeO^a$ | $BeO^b$ | Be | None |
|---|---|---|---|---|---|---|---|
| R | 16.1 | 16.3 | 20.7 | 14.7 | 16.3 | 15.5 | 27.3 |
| G | 600 | 622 | 1,273 | 456 | 622 | 535 | 2,920 | a Density=3.
b Density=2.

From the above Table III it will be apparent that $H_2O$ is a somewhat poorer reflector than graphite, $D_2O$, beryllium, or beryllium oxide. It will be noted from the above table that the actual density of the neutron reflector has some bearing upon the reflecting character of the material as shown by the fact that a substantially smaller critical mass is required where beryllium oxide is compacted to a density of 3 than where this oxide has a density of 2.

From the above data it will be apparent that no hard and fast figure for critical mass may be given since the mass will vary with the nature of the moderator, nature of the fissionable isotope, concentration in moderator, nature and depth of reflector as well as concentration of impurities including uranium 238 and thorium 232. Generally speaking, however, not less than about 200 grams of the fissionable isotope is required using the best of moderators and securing maximum neutron reflection at optimum concentration. Where ordinary water is used not less than about 300 grams of fissionable isotope will be required and where the fissionable isotope is uranium 235 the minimum concentration for the best available moderator will be at least about 300 grams and for water it will be at least about 500 grams. These concentrations must be increased with increasing concentration of impurities including coolant or other neutron absorbing agent and also with variation in the concentration and neutron reflection of the system. Moreover, the actual amount used in a reaction is somewhat higher since the reactor generally is desired to be larger than critical size.

The reactors herein contemplated are operative when using pure fissionable isotopes such as pure uranium 233, pure plutonium 239, etc. However, such purity is not necessary and frequently it is desirable to conduct the reaction in the presence of an isotope capable of absorbing neutrons to yield a further quantity of fissionable isotope as the reaction proceeds. Thus uranium containing uranium 238 in concentrations, for example about 5 to 99 percent, the balance being uranium 235, offers certain advantages since uranium 238 is converted to plutonium 239 which aids uranium 235 to support the reaction. The same is true when thorium 232 is used in lieu of uranium 238, as uranium 233 is formed during the reaction.

From the above description it can be seen that fissionable isotopes when used in higher concentrations in a moderator than are obtainable naturally can be employed to create a self-sustaining chain reaction in a very small reactor, the amounts of fissionable isotope necessary being of the order of less than a kilogram.

The examples used only a small quantity of beryllium material. Larger quantities may be used to advantage, particularly with the more soluble salts such as the nitrates and with lower concentrations of the fissionable material when employing higher enrichment. Although beryllium and its compounds are the preferred reactive materials, it is within the scope of the invention to use any other reactive material which emits neutrons when subjected to alpha and gamma radiation. Furthermore, the liquid moderators are preferably oxides of hydrogen isotopes but other moderators, including organic liquids such as alcohol, benzene, benzine, ether, glycols, and/or ketones, may be employed.

Although the present invention has been described with reference to the specific details of certain embodiments

We claim:

A neutronic reactor comprising a spherical vessel having a diameter of about 12″, a liquid, said vessel substantially filled with said liquid, said liquid comprising a solution of ordinary water and uranium sulphate, said uranium having about 14.7 percent by weight of the fissionable isotope $U^{235}$, said solution containing a quantity of said fissionable isotope in solution of about 570 grams, beryllium oxide as a neutron reflecting means substantially surrounding said vessel, and means for increasing the safety of said reactor by raising the ratio of delayed neutrons to prompt neutrons, said means including a soluble sulphate salt of beryllium dissolved in said liquid fuel wherein said soluble salt of beryllium is about 6 percent by weight of said liquid fuel.

References Cited in the file of this patent

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |

OTHER REFERENCES

U. S. Atomic Energy Comm. AECD–3063. Water Boiler by C. B. Baker, etc. Sept. 4, 1944, Los Alamos Scientific Lab. Available from Technical Information Service, Oak Ridge, Tenn. Pages 1–5, 10, 13, 16.

Kelly et al.: Phy. Rev. 73, 1135–9 (1948).

Goodman: "The Science and Eng. of Nuclear Power," vol. 1, page 303, Addison-Wesley Press, Inc. (1947).

Nuclear Radiation Physics by R. E. Lapp and H. L. Andrews, Prentice-Hall, Inc., N. Y. (1948), pages 322, 323.